H. A. DENMIRE.
COLLAPSIBLE TIRE CORE.
APPLICATION FILED FEB. 17, 1919.

1,358,941.

Patented Nov. 16, 1920.
3 SHEETS—SHEET 1.

INVENTOR
Harold A. Denmire,
ATTORNEYS

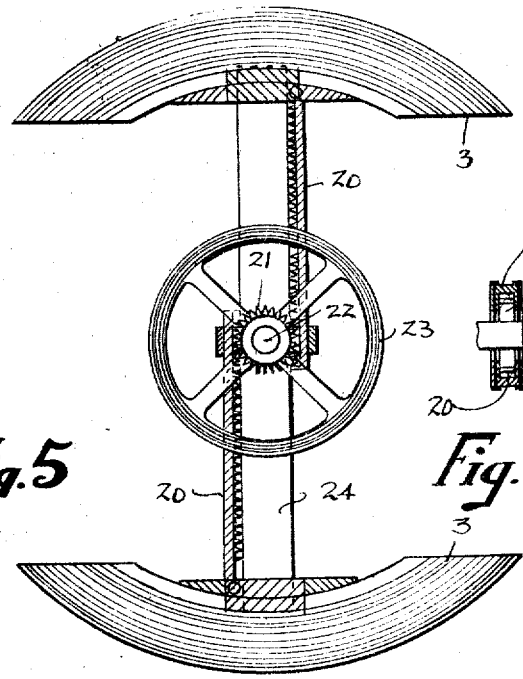
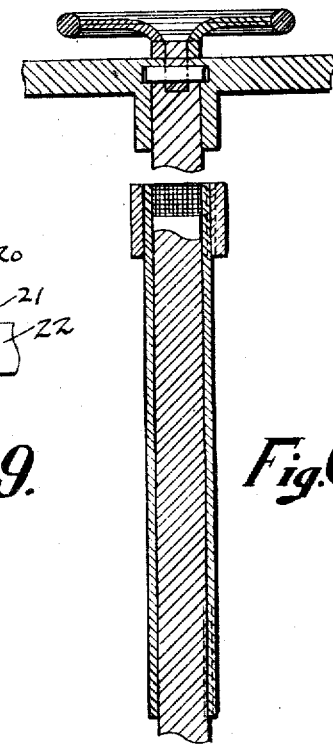
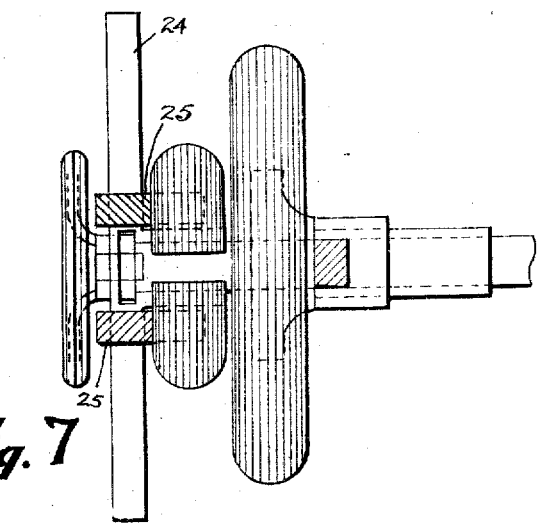
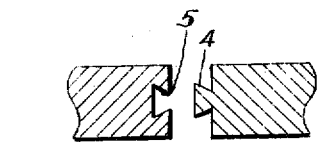

UNITED STATES PATENT OFFICE.

HAROLD A. DENMIRE, OF AKRON, OHIO, ASSIGNOR OF ONE-HALF TO THE GENERAL TIRE & RUBBER COMPANY, OF AKRON, OHIO, A CORPORATION OF OHIO.

COLLAPSIBLE TIRE-CORE.

1,358,941.  Specification of Letters Patent.  Patented Nov. 16, 1920.

Application filed February 17, 1919. Serial No. 277,476.

*To all whom it may concern:*

Be it known that I, HAROLD A. DENMIRE, a citizen of the United States, and a resident of Akron, county of Summit, and State of Ohio, have invented a new and useful Improvement in Collapsible Tire-Cores, of which the following is a specification, the principle of the invention being herein explained and the best mode in which I have contemplated applying that principle, so as to distinguish it from other inventions.

The present invention relates to cores for tire casings, the cores being collapsible in order to permit the removal of the completed tire. The object of the present invention is the provision of a collapsible core upon which the tire may be readily built but which is so arranged that, as soon as the tire is completed, it may be removed and the core immediately used again for another tire. Other objects are the provision of satisfactory operating means for collapsing and expanding the core. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
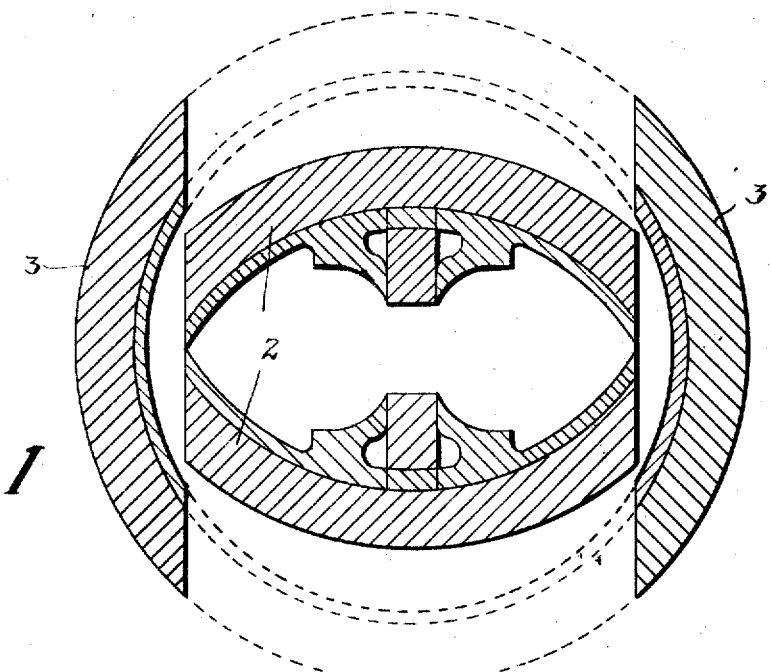
Figure 2:
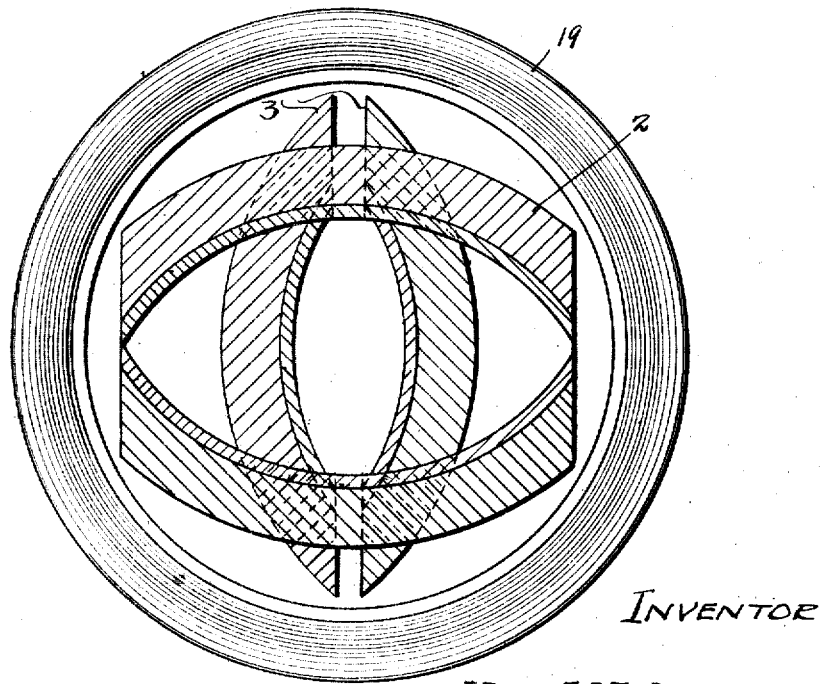
Figure 3:
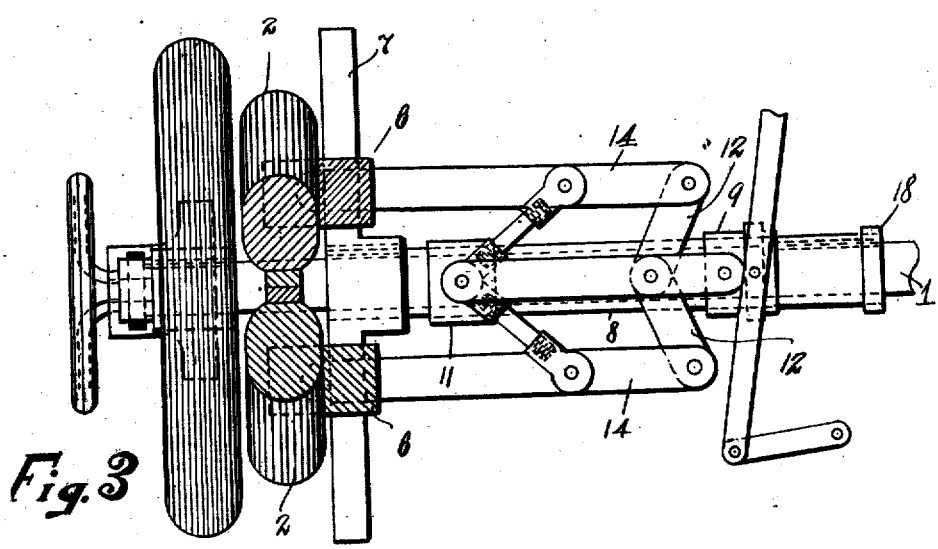
Figure 4:
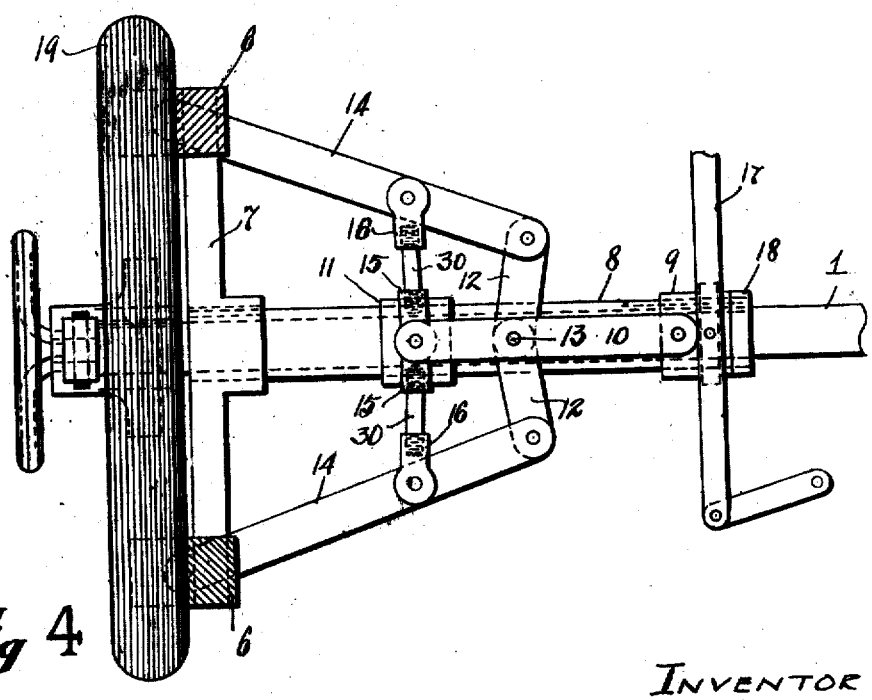

Figure 1 is a section through the mold showing it in semi-collapsed position; Fig. 2 is a section showing the entire core collapsed in a tire casing shown in elevation; Fig. 3 is a plan view showing the arrangement of parts in one position; Fig. 4 is a similar view showing the parts in a different position; Fig. 5 is a front elevation partially in section showing arrangement of actuating means; Fig. 6 is a longitudinal section showing a detail; Fig. 7 is an elevation showing the forward members collapsed; Fig. 8 are views showing the interengaging core ends; and Fig. 9 is a section of a detail.

The present device or collapsible core is adapted to be mounted in any suitable manner, the core and operating mechanism being carried upon a shaft 1. The core is made up of four quadrants 2 and 3, the opposite quadrants or portions being operated in unison as will more fully appear. These sections 2 and 3 have tongue and grooved ends 4 and 5, as shown in Fig. 8, so that they are firmly locked together into a rigid structure when in their outward positions.

As illustrated in Figs. 3 and 4, the shaft 1 carries the operating mechanism. The two sections 2 are provided with blocks 6 which have a sliding connection with a movable plate or cross-member 7. Surrounding the shaft 1 is a sleeve 8 upon which the cross-member 7 is mounted. Slidingly mounted on the sleeve is a collar 9 having a link 10 attached thereto and extending along the sleeve to a second collar 11, to which it is attached. Two links 12 are pivotally attached to the sleeve at 13 and are pivotally connected at their outer ends to other links 14 which in turn are pivotally attached to the blocks 6. Pivotally attached to the collar 11 are tapped stubs 15 and similar stubs 16 are pivotally connected to the links 14. These stubs are connected by threaded rods 30 which are received in the stubs so as to make adjustable toggle connections.

The collar 11 is slidably mounted upon the sleeve as well as the collar 10, the latter collar being movable by means of a lever 17 suitably connected thereto. The sleeve 8 is provided with a flange 18 at its rear end which will be engaged by suitable mechanism to move the sleeve along the shaft.

In the expanded position of section 2, the parts are in the position shown in Fig. 4. To collapse and remove the sections 2, the collar 10 is first moved by means of the lever to the position shown in Fig. 3 when the sections will be moved radially inward by means of the links and toggle connections. The sleeve 8 is then retracted by means of the flange 18 which withdraws the collapsed sections 2 and cross-member 7 rearwardly of the tire 19.

The other pair of opposed cross-sections 3 are operated from the front of the device. The sections are carried by racks 20 which engage with a gear 21 carried by a shaft 22 operable by a hand-wheel 23 at the front of the machine. A cross-member 24 is provided which has sliding engagement with blocks 25 attached to the sections. The shaft 22 is mounted in the apertured end of the main shaft 1, so that it may be rotated therein.

To collapse the sections 3 and withdraw them from the tire, the hand-wheel is first rotated until the sections 3 are withdrawn radially from the tire until they are in the position shown in Fig. 7, in which position they are entirely free from the tire proper.

It is necessary to retract the sections 2 laterally or along the shaft before the sections 3 are moved radially, Fig. 1 illustrating the position of sections 2 when retracted and Fig. 2 the super-imposed relation of the four sections completely withdrawn from the tire 19.

The present mechanism allows tires to be built upon cores and then removed before curing so that they may be cured upon air bags. The main shaft upon which the operating mechanism is carried may be either a shaft of a tire building machine or the shaft of the stand where the tires are handmade. Heretofore a large number of cores have been necessary as the tires were cured on the cores but with the present device the number of cores may be materially reduced and the added advantage of curing on air bags obtained.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a collapsible tire core, the combination of a plurality of core sections, means for holding said sections in their expanded position, means for moving one of said sections radially inward, and then laterally and other means for collapsing said remaining sections.

2. In a collapsible tire core, the combination of a plurality of core sections, means for holding said sections in their expanded position, mechanism to move a certain of said sections radially inward and then laterally, and other mechanism adapted to collapse the remaining sections sufficiently to permit the removal of a tire.

3. In a collapsible tire core, the combination of core sections arranged in pairs, means for holding said sections in their expanded position, means for moving said pairs of sections radially inward, and other means for moving one of said pairs laterally.

4. In a collapsible tire core, the combination of two pairs of opposed core sections, means for maintaining said pairs of sections in their expanded position, means for moving one of said pairs radially inwardly and then laterally, and other means for moving said second pair of sections radially toward each other.

5. In a collapsible tire core, the combination of a main shaft, two pairs of core sections carried by said shaft and adapted to form a tire core in their expanded position, means mounted on said shaft and connected to one pair of said sections to move them radially and then laterally along said shaft, and other means carried by said shaft and adapted to collapse said other pair of sections radially.

6. In a collapsible tire core, the combination of a main shaft, two pairs of core sections carried by said shaft and adapted to form a tire core in their expanded position, a sleeve mounted on said shaft, a cross-member carried by said sleeve and having sliding engagement with one pair of said sections, operating mechanism mounted on said sleeve and connecting said sections and adapted to collapse said sections radially and then move them laterally along said shaft, and other means carried by said shaft and adapted to collapse the other pair of said sections radially.

7. In a collapsible tire core, the combination of a main shaft, two pairs of core sections carried by said shaft and adapted to form a tire core in their expanded position, a sleeve mounted on said shaft, a cross-member carried by said sleeve and having sliding engagement with one pair of said sections, collars slidably mounted on said sleeve, toggle and link mechanism connected to said collars and said sections whereby said pair of sections may be moved first radially inward and then laterally along said shaft, and other means for collapsing said other pair of core sections radially.

8. In a collapsible tire core, the combination of a main shaft, two pairs of core sections carried by said shaft and adapted to form a tire core in their expanded position, a sleeve mounted on said shaft, a cross-member carried by said sleeve and having sliding engagement with one pair of said sections, collars slidably mounted on said sleeve, toggle and link mechanism connected to said collars and said sections whereby said pair of sections may be moved first radially inward and then laterally along said shaft, a second cross member mounted on said shaft in front of said sections and having sliding engagement with said other pair of core sections, and means for moving said latter pair of sections radially along said cross-member.

Signed by me, this 13th day of February, 1919.

HAROLD A. DENMIRE.